Nov. 6, 1956  E. C. CARLSON ET AL  2,769,296
BALANCED DOUBLE KNIFE MOWER
Filed Oct. 9, 1953  2 Sheets-Sheet 2
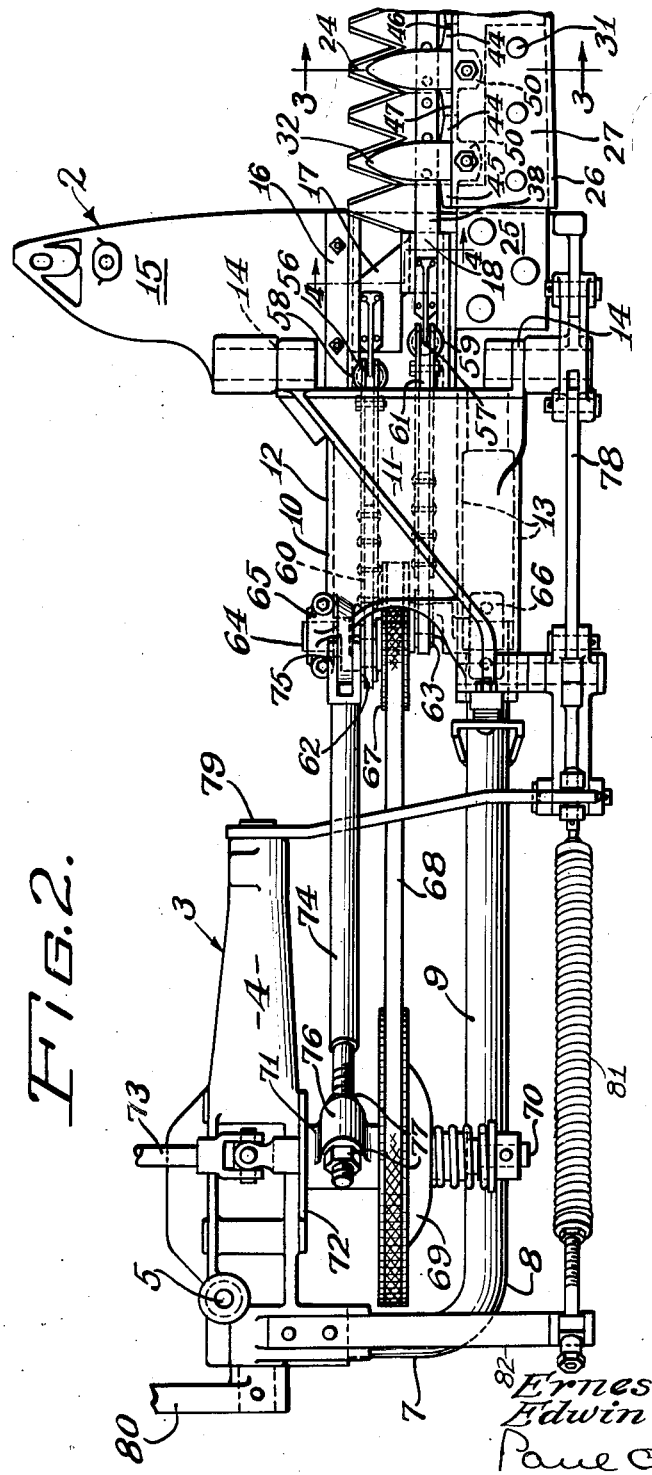
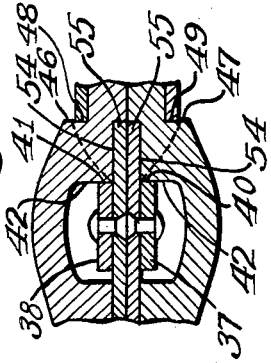
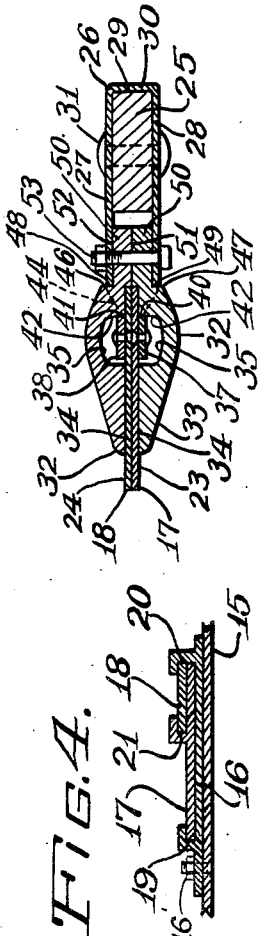
Inventors.
Ernest C. Carlson
Edwin F. Huddle
Paul O. Pippel
Atty.

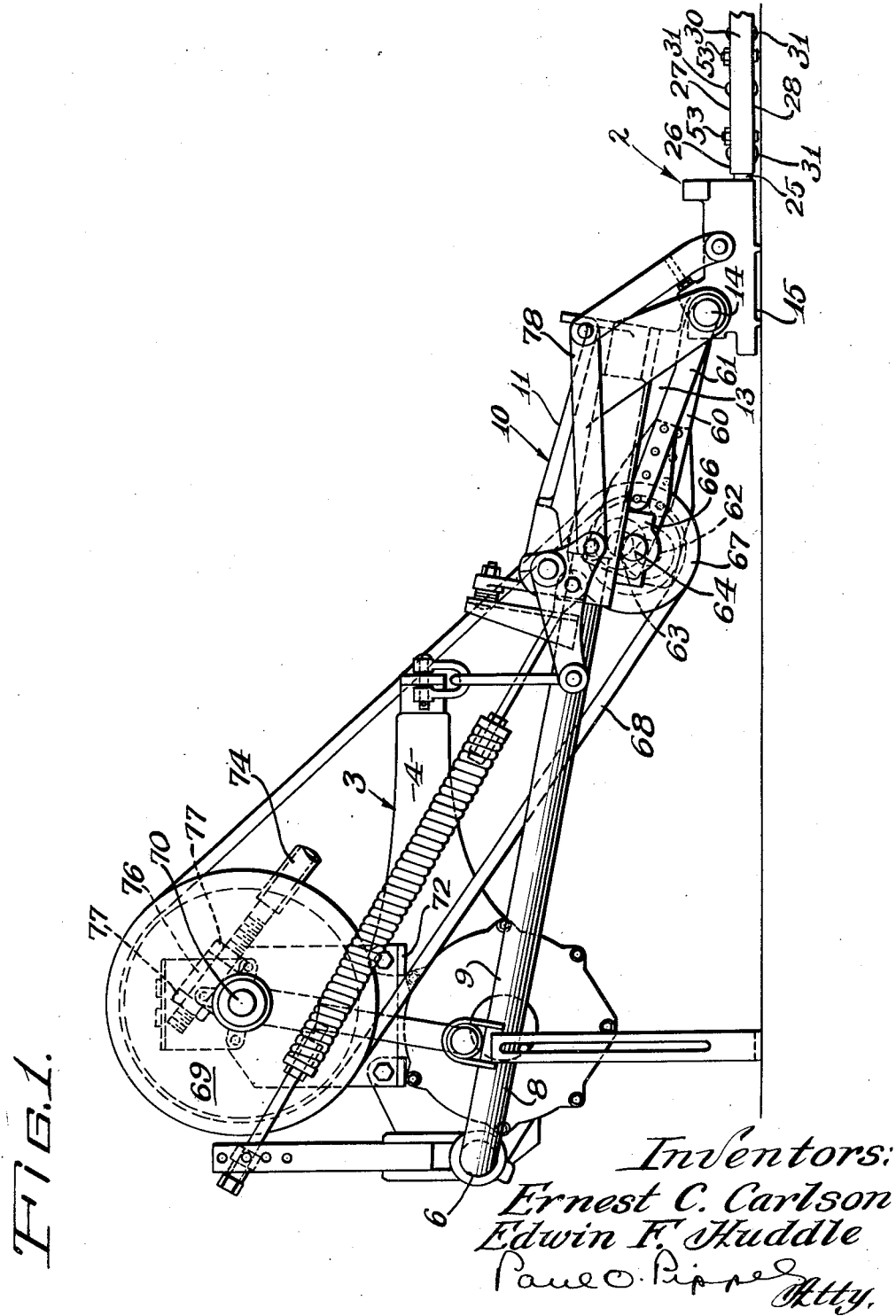

United States Patent Office 2,769,296
Patented Nov. 6, 1956

2,769,296
BALANCED DOUBLE KNIFE MOWER

Ernest C. Carlson, Wheaton, and Edwin F. Huddle, Elmwood Park, Ill., assignors to International Harvester Company, a corporation of New Jersey Application October 9, 1953, Serial No. 385,217

3 Claims. (Cl. 56—297)

This invention relates to mowers and more specifically to a novel balanced mower.

A general object of the invention is to devise a novel counterbalanced mower incorporating a pair of oppositely reciprocating knives.

A more specific object is to devise novel operating means for the knives which provides extremely short driving connections.

A still further object is to devise a simple, efficient and durable double sickle mower.

Another object is to devise a novel cutter bar for such mower comprising a pair of sickles carried from a support solely by a plurality of clip guards to minimize friction losses.

These and other objects of the invention will become more apparent from the specification and the drawings wherein:

Figure 1 is a fragmentary rear view of the novel mower;

Figure 2 is a fragmentary plan view of the mower;

Figure 3 is a sectional view on line 3—3 of Figure 2;

Figure 4 is a sectional view, with parts omitted, substantially on line 4—4 of Figure 2; and Figure 5 is a fragmentary enlarged view of a portion of the device shown in Figure 3.

The novel mower assembly, generally designated 2, comprises a support frame structure 3 including a transverse frame member 4 which is provided at one end with a vertical pivot opening 5 for reception of a pivot bolt, not shown, for connection to associated frame structure carried by the tractor (not shown) in the manner shown and described in U. S. Patents 2,403,365 and 2,387,070. The member 4 is also provided at said one end with a horizontal pivot opening 6 receiving a fore and aft extending end portion 7 of an L-shaped coupling bar 8 which at the rear end of portion 7 has a laterally extending leg 9 generally parallel to member 4. The outer or free end of the bar 9 is socketed within and connected to a combined yoke member and housing 10 which comprises a top wall 11 and depending end walls 12 and 13.

The outer end of the yoke is hinged at 14 on a fore and aft axis to an inner shoe 15 which supports a wear plate 16 upon which is slidably mounted the inner end of the lower sickle 17 upon which is superposed an upper sickle 18 in shearing coaction therewith. The plate 16 is connected to the shoe 15 as by bolts 16' and has dovetail slidable connections with the sickle bars 17 and 18 at 19 and 20, respectively, and the sickle bars are slidably dovetailed together at 21 whereby the knives are guided relative to each other and to the shoe wear plate as seen in Figure 4.

The knives 17 and 18 are provided at their forward edges with teeth 23, 24, respectively, which are sharpened at their side edges for shearing action.

The shoe 15 is provided with a laterally extending securing element comprising a plate 25 connected to the shoe and projecting into the inner end of a forwardly open U-shaped sheath or support element 26 between the spaced upper and lower webs 27 and 28 thereof and in abutment at 29 with the rear web 30 of the sheath. The plate 25 is connected as by rivets 31 to the top and bottom webs 27 and 28 of the support or carrier 26.

The sickles 18 and 19 are disposed in front of the carrier structure 26, which includes the inner shoe, and are received between pairs of opposed clip guards 32 which are cruciform in plan. Each clip guard has a nose portion 33 extending forwardly from the carrier 26 and tapered toward the plane of the sickle and providing on its inner side a generally flat bearing surface 34 in slidable guiding engagement with the outer side of the related knive blades 17 or 18. Each nose portion is provided with a transverse inwardly open slot 35 which admits a knife blades 17 od 18. Each nose portion is provided of blades 17 and 18 intermediate the front and rear edges thereof. The rear edges of knife backing elements 37 and 38 have generally vertical surfaces 40, 41 in complementary flat-face engagement with the rear vertical side 42 of the related slot 35.

Each clip guard also comprises oppositely extending lateral arms 44, 45 which are provided with rear edge surfaces 46, 47 in engagement with the forward edge 48 or 49 of the top and bottom webs of the carrier 26. Each clip guard further comprises a heel portion 50, the heel portions 50 of each pair of clip guards seating complementally against each other as at 51 along planar surfaces and at their remote outer sides 52 entered between and against the inner sides of the top and bottom webs of the carrier and connected thereto as by a nut and bolt assembly 53. The arms 44, 45 as well as the intervening rear portion of the nose of each clip guard is recessed at 54 to provide a complementary slot receiving the rear edge portion 55 of the related knife whereby the rear edges of the knives are held in close couple to maintain the blades from spreading vertically so that the teeth are held in shearing relationship.

The inner ends of the sickles 17 and 18 are provided with ball joints 56, 57 entered into socket assemblies 58, 59 on the outer ends of pitmans 60, 61, which extend longitudinally through the yoke and at their inner ends are journaled or rotatably connected to opposite diametrically opposed throws 62, 63 of crankshaft 64 adjacent to opposite ends thereof, the crankshaft being located at the inner end of the yoke and extending transversely thereof, and having opposite ends rotatably supported in split bearings 65, 66, the upper halves of which are formed integral with walls 12 and 13 of the yoke housing, respectively, and the lower halves being bolted thereto about the adjacent end of the crankshaft. The throws 62, 63 and pitmans are positioned at equal distances at opposite side of the center of gravity of the sickles.

The crankshaft is connected between said throws 62, 63 with a sheave or pulley 67 located in an upright plane at the center of gravity of the sickles, the pulley 67 being driven by a belt 68 trained thereabout and about a pulley 69 which is connected (preferably through a slip clutch) to a shaft 70 mounted in a bearing 71 which is connected to a bracket 72 connected to the frame member. The shaft 70 is connected through universal couplings and shafts 73 to the power take off of the tractor.

Adjustment of the tension in the belt is effected by a rod assembly 74 which parallels the belt and is pivotally connected at its outer end as at 75 to an upstanding ear on the inner end of the yoke, the opposite end of the bar having a threaded end extending through an opening in a lug 76 on the bearing 71, and nuts 77 being threaded on the bar in abutment with opposite sides of lug 76.

The cutter bar is adjusted to be raised and lowered through a conventional operating linkage 78 which is connected to a rock shaft 79 journalled through the frame member and connected through a lever 80 to the hydraulic actuating mechanism of a tractor as will be readily understood by those skilled in the art. The operating linkage 78 is connected to a counterbalancing tension spring 81 which is connected at its lower end through the linkage to the yoke 11 and at its upper end to the upright standard 82 which is connected to the frame 3. The spring 81 thus, in addition to counterbalancing the upright of the mower bar, serves as an effective cushion to vertical oscillations developed by the crankshaft drive.

We claim:

1. In a mowing device, a mower support frame comprising a laterally extending coupling member terminating in an outer end, a yoke housing connected to said outer end of said coupling member, a carrier structure pivotally connected to said yoke housing on a fore and aft axis for vertical pivotal movement, a pair of reciprocating members slidably mounted upon said carrier structure for longitudinal reciprocal movement and including at least one sickle, a crankshaft journalled on said yoke housing on a fore and aft axis and having a pair of diametrically opposed throws, pitmans rotatably connected to said throws and respective members and enclosed in said yoke housing, and driving means connected to said crankshaft and including driving and driven pulleys mounted respectively on said frame and crankshaft and a belt trained thereabout, and said driving means disposed in an upright plane extending lengthwise medially of said members, and said driven pulley being disposed in close proximity to the ground in the operating position of the mowing device, and said driving pulley disposed at a level of a power take-off of an associated tractor, and tension spring means connected at one end to said yoke adjacent to said crankshaft and extending generally parallel to said plane diagonally upwardly away from the yoke, and a standard connected to the frame and connected to the other end of the spring means.

2. A mowing device according to claim 1 and said pitmans extending longitudinally of said members and disposed in upright planes extending at opposite sides and generally parallel to the medial longitudinal line thereof.

3. A mowing device comprising a support including a laterally extending coupling element, a carrier bar connected to said element, a pair of longitudinally reciprocal members including a sickle upon said carrier bar, a crankshaft journalled upon said support on a fore and aft axis in close proximity to said members and having a pair of diametrically oppositely disposed throws, a pair of pitmans operatively interconnecting respective members and throws, said pitmans disposed at opposite sides of the center of gravity of said members, a driving pulley connected to said crankshaft and disposed substantially in the plane of said center of gravity of said members between said throws of the crankshaft.

References Cited in the file of this patent
UNITED STATES PATENTS

| | | |
|---|---|---|
| 536,924 | Dorney | Apr. 2, 1895 |
| 738,033 | Haynes | Sept. 1, 1903 |
| 834,969 | Clarkson | Nov. 6, 1906 |
| 1,094,260 | Siegfried | Apr. 21, 1914 |
| 1,243,095 | Patterson | Oct. 16, 1917 |
| 2,096,558 | Pierson et al. | Oct. 19, 1937 |
| 2,157,041 | Wagner | May 2, 1939 |
| 2,616,234 | Love | Nov. 4, 1952 |
| 2,630,670 | Sherman | Mar. 10, 1953 |
| 2,664,690 | Huddle et al. | Jan. 5, 1954 |